US005679959A

United States Patent [19]

Nagase

[11] Patent Number: 5,679,959

[45] Date of Patent: Oct. 21, 1997

[54] BILL DISCRIMINATING APPARATUS

[75] Inventor: Mitsuhiro Nagase, Koto-ku, Japan

[73] Assignee: Laurel Bank Machines Co., Ltd., Tokyo, Japan

[21] Appl. No.: 580,644

[22] Filed: Dec. 29, 1995

[30] Foreign Application Priority Data

Jan. 11, 1995 [JP] Japan .................................... 7-002925
Nov. 27, 1995 [JP] Japan .................................... 7-307675

[51] Int. Cl.[6] .............................. G07D 7/00; G01N 21/64

[52] U.S. Cl. .......................................................... 250/458.1

[58] Field of Search .............................. 250/458.1, 459.1, 250/461.1, 372

[56] References Cited

U.S. PATENT DOCUMENTS

| | | | |
|---|---|---|---|
| 4,114,804 | 9/1978 | Jones et al. | 250/372 |
| 4,277,774 | 7/1981 | Fujii et al. . | |
| 4,650,320 | 3/1987 | Chapman et al. . | |
| 5,280,333 | 1/1994 | Wunderer . | |
| 5,459,323 | 10/1995 | Morgan | 250/458.1 |

FOREIGN PATENT DOCUMENTS

| | | |
|---|---|---|
| 622762 | 11/1994 | European Pat. Off. . |
| 94/16412 | 7/1994 | WIPO . |

*Primary Examiner*—David P. Porta
*Assistant Examiner*—Richard Hanig
*Attorney, Agent, or Firm*—Cushman, Darby & Cushman IP Group of Pillsbury Madison & Sutro LLP

[57] ABSTRACT

A bill discriminating apparatus includes a light source for projecting a stimulating light onto a surface of a bill, a photomultiplier for photoelectrically detecting light emitted from the surface of the bill in response to the irradiation with the stimulating light and producing detected data corresponding to an amount of the detected light, a ROM for storing reference data, and a CPU for comparing the detected data produced by the photomultiplier and the reference data stored in the ROM and discriminating the bill.

6 Claims, 7 Drawing Sheets

BILL DISCRIMINATING APPARATUS

BACKGROUND OF THE INVENTION

The present invention relates to a bill discriminating apparatus for discriminating whether or not a bill is current and, in particular, to a bill discriminating apparatus for discriminating whether or not a bill is current by detecting phosphor material contained in a printed portion of the bill.

DESCRIPTION OF THE PRIOR ART

Recently, bills stamped with an ink containing phosphor material and bills printed with an ink containing phosphor material have been issued for preventing bills from being counterfeited.

Therefore, there have been proposed bill discriminating apparatuses for discriminating whether or not a bill is current by detecting phosphor material contained in the ink used for stamping or phosphor material contained in the ink used for printing the bill.

For example, Japanese Patent Application Laid-Open No. 55-32132 discloses a bill discriminating apparatus for discriminating whether or not a bill is current by irradiating the bill with ultraviolet rays using a mercury vapor lamp, photoelectrically detecting light emitted from phosphor material contained in an ink on the surface of the bill in response to stimulation by the ultraviolet rays, detecting a distribution pattern of the phosphor material and comparing the detected pattern with a reference pattern.

However, since this bill discriminating apparatus discriminates whether or not a bill is current by detecting a pattern of phosphor material and comparing it with a reference pattern, if a fluorescent ink pen is used to coat phosphor material on the surface of a copy of a bill in the same pattern as that of the phosphor material on the surface of a genuine bill, the pattern of phosphor material obtained by photoelectrically detecting light emitted from the surface of the copy will coincide with that obtained by photoelectrically detecting light emitted from phosphor material contained in the ink on the surface of the genuine bill. Therefore, it becomes impossible to correctly discriminate the copy of a bill as a counterfeit bill and the discriminating accuracy is inevitably low.

SUMMARY OF THE INVENTION

It is therefore an object of the present invention to provide a bill discriminating apparatus which can discriminate whether or not a bill is current with high accuracy by detecting phosphor material contained in an ink on the surface of the bill.

The above and other objects of the present invention can be accomplished by a bill discriminating apparatus comprising stimulating light irradiating means for projecting a stimulating light onto a surface of a bill, photoelectrical converting means for photoelectrically detecting light emitted from phosphor material on the surface of the bill in response to the irradiation with the stimulating light to produce detected data corresponding to the amount of the detected light, reference data storing means for storing reference data and discriminating means for comparing the detected data produced by the photoelectrical converting means and the reference data stored in the reference data storing means and discriminating the bill.

The amount of light emitted from a phosphor material is proportional to the wavelength of the light and, therefore, it is possible to discriminate the kind of phosphor material by detecting the amount of light emitted from the phosphor material. According to the present invention, since light emitted from the surface of a bill in response to the irradiation with a stimulating light is photoelectrically detected and a bill is discriminated by comparing detected data corresponding to the amount of the detected light and reference data, even in the case where phosphor material is coated on a copy of a bill in the same pattern as that of phosphor material in a stamped or printed portion of a current bill, it is possible to reliably discriminate such a counterfeit bill and, therefore, the discriminating accuracy is high.

In a preferred aspect of the present invention, the discriminating means is constituted so as to discriminate a bill by comparing the value of data detected when a predetermined time period has passed after completion of irradiation with the stimulating light by the stimulating light irradiating means with corresponding reference data.

According to this preferred aspect of the present invention, since a bill is discriminated by comparing the value of the detected data indicating an amount of the received light corresponding to the wavelength of light emitted from phosphor material with the value of the corresponding reference data, even in the case where phosphor material is coated on a copy of a bill in the same pattern as that of phosphor material in a stamped or printed portion of a current bill, it is possible to reliably discriminate such a counterfeit bill and, therefore, the discriminating accuracy is high.

In a further preferred aspect of the present invention, the discriminating means is constituted so as to discriminate a bill by comparing data detected at a plurality time points after completion of irradiation with the stimulating light by the stimulating light irradiating means with corresponding reference data.

According to this further preferred aspect of the present invention, it is possible to discriminate a bill with even higher accuracy.

In another preferred aspect of the present invention, the discriminating means is constituted so as to discriminate a bill by comparing the time required for the detected data to become a predetermined value after completion of irradiation with the stimulating light by the stimulating light irradiating means with time required for the reference data to become the predetermined value after the completion of irradiation with the stimulating light.

According to this preferred aspect of the present invention, since a bill is discriminated by comparing the time required for the value of the detected data indicating an amount of the received light corresponding to the wavelength of light emitted from phosphor material to become a predetermined value with the time required for the value of the reference data value to become the predetermined value, even in the case where phosphor material is coated on a copy of a bill in the same pattern as that of phosphor material in a stamped portion of a current bill, it is possible to reliably discriminate such a counterfeit bill and, therefore, the discriminating accuracy is high.

In a further preferred aspect of the present invention, the discriminating means is constituted so as to discriminate a bill by comparing the times required for the detected data to become a plurality of different predetermined values after completion of irradiation with the stimulating light by the stimulating light irradiating means with the times required for the reference data to become the corresponding values after the completion of irradiation with the stimulating light.

According to this further preferred aspect of the present invention, it is possible to discriminate a bill with even higher accuracy.

In a further preferred aspect of the present invention, the reference data storing means stores, as the reference data, first reference data obtained by irradiating a genuine bill with a stimulating light and photoelectrically detecting light emitted from phosphor material on the surface of the genuine bill, second reference data obtained by irradiating a copy of a bill and photoelectrically detecting light emitted from the surface of the copy and third reference data obtained by irradiating a copy of a bill on which phosphor material has been coated and photoelectrically detecting light emitted from phosphor material on the surface of the copy, and the discriminating means discriminates a bill by comparing the detected data produced by the photoelectrical detecting means with the first reference data, the second reference data and the third reference data.

According to this further preferred aspect of the present invention, it is possible to discriminate a bill with even higher accuracy.

The above and other objects and features of the present invention will become apparent from the following description made with reference to the accompanying drawings.

DESCRIPTION OF THE PREFERRED EMBODIMENTS

Figure 1:
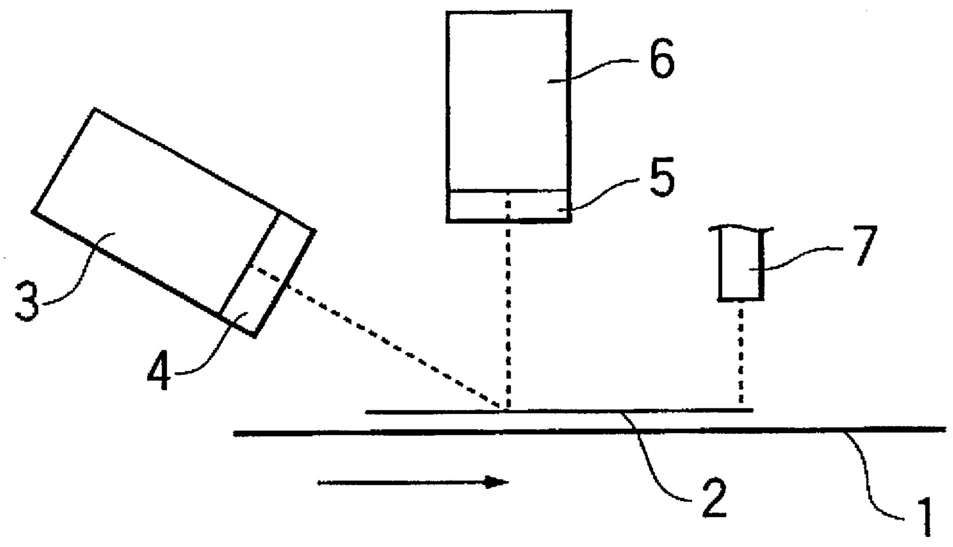
FIG. 1 is a schematic side view of a bill discriminating apparatus which is an embodiment of the present invention.

As shown in FIG. 1, a bill discriminating apparatus which is an embodiment of the present invention includes a xenon flash lamp 3 for emitting a stimulating light toward a bill 2 being transported in a bill transporting passage 1, a filter 4 attached onto the front face of the xenon flash lamp 3 for transmitting only a stimulating light having a wavelength in the vicinity of 365 nm which can efficiently stimulate phosphor material contained in an ink on the surface of the bill 2 and a photomultiplier 6 on the front face of which a filter 5 for cutting light reflected from the surface of the bill 2 is attached and which is adapted for photoelectrically detecting light emitted from the phosphor material contained in an ink on the surface of the bill 2. In FIG. 1, the reference numeral 7 designates a sensor for detecting the leading end portion of the bill 2 being transported in the bill transporting passage 1. The sensor 7 may be constituted by a photosensor.

Figure 2:
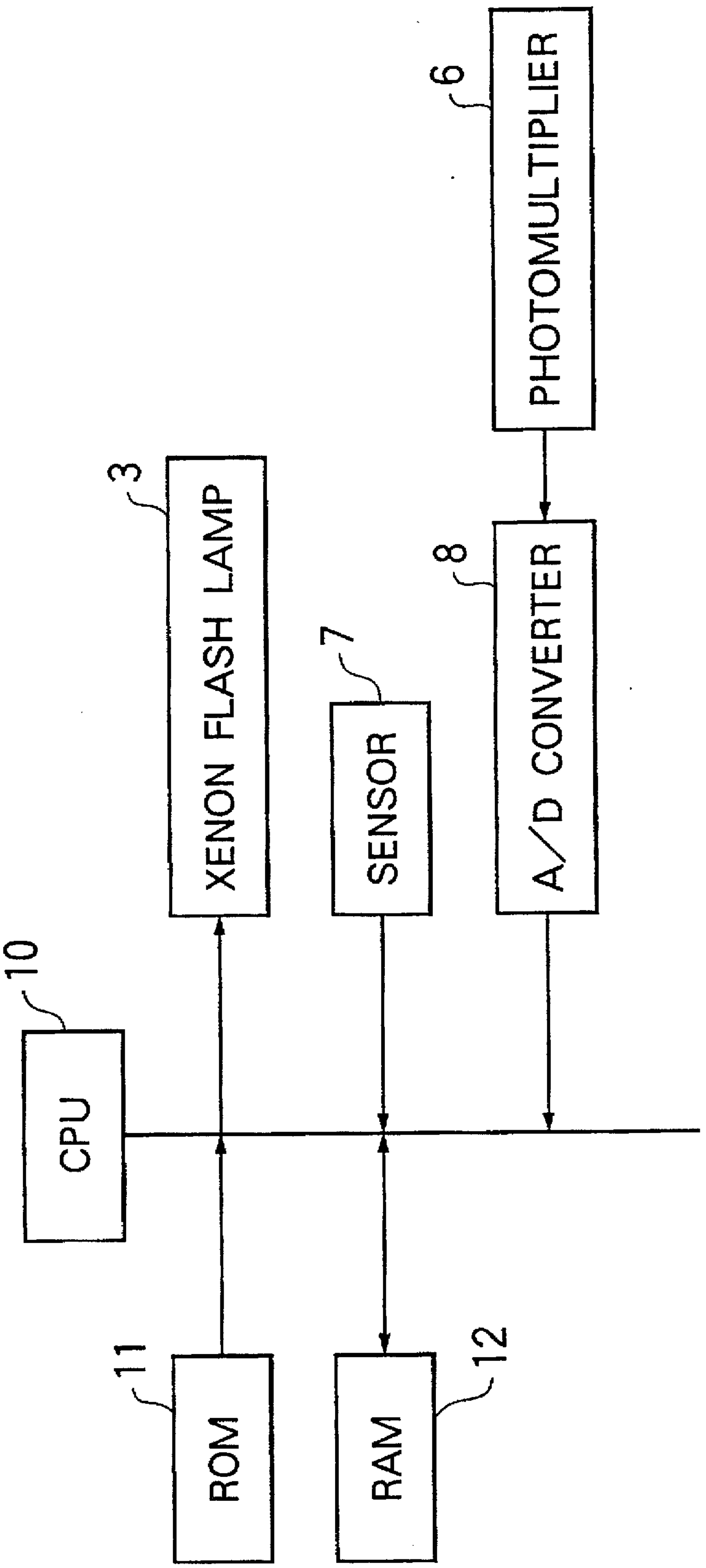
FIG. 2 is a block diagram of a detection system and a control system of a bill discriminating apparatus which is an embodiment of the present invention.

FIG. 2 is a block diagram of a detection system and a control system of the bill discriminating apparatus which is an embodiment of the present invention.

As shown in FIG. 2, the detection system of the bill discriminating apparatus includes the photomultiplier 6 for photoelectrically detecting light emitted from phosphor material contained in an ink on the surface of a bill 2 and producing voltage signals in accordance with the detected amount of light, an A/D converter 8 for converting the voltage signals produced by the photomultiplier 6 to digital signals, and the sensor 7 for detecting the leading end portion of the bill 2 being transported in the bill transporting passage 1. The control system of the bill discriminating apparatus includes a CPU (central processing unit) 10 for controlling the entire bill discriminating apparatus, a ROM (read-only memory) 11 for storing a processing program to be effected by the CPU 10 and a RAM (random access memory) 12.

Figure 3:
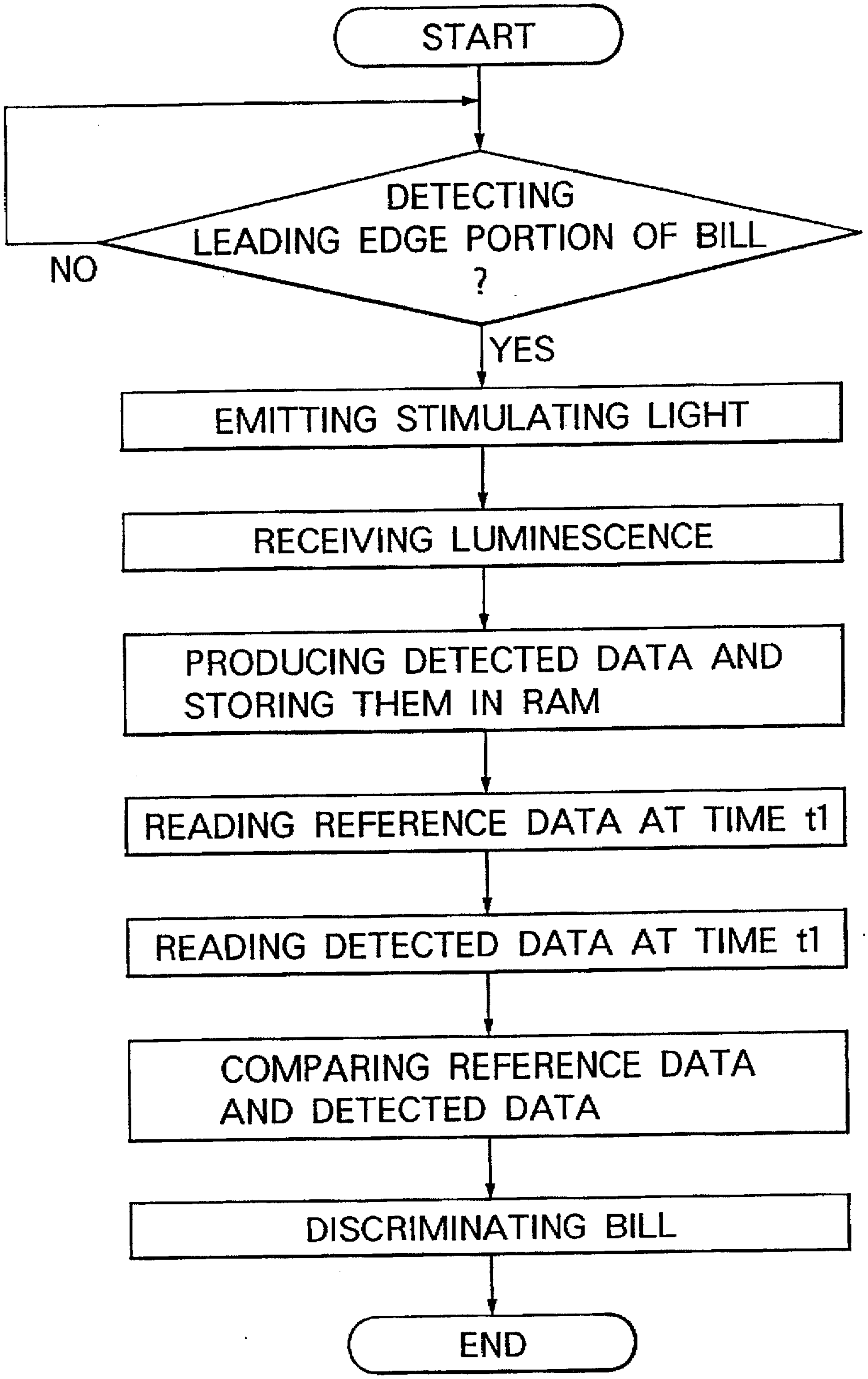
FIG. 3 is a flow chart showing one example of a bill discriminating procedure effected by a bill discriminating apparatus which is an embodiment of the present invention.

FIG. 3 is a flow chart showing one example of a bill discriminating procedure effected by the thus constituted bill discriminating apparatus.

As shown in FIG. 3, when the sensor 7 detects the leading end portion of the bill 2 being transported in the bill transporting passage 1, a bill detection signal is output from the sensor 7 to the CPU 10. When the CPU 10 receives the bill detection signal from the sensor 7, it outputs a light emitting signal to the xenon flash lamp 3. When the xenon flash lamp 3 receives the light emitting signal from the CPU 10, it emits a stimulating light toward the entire surface of the bill 2. Of the light emitted from the xenon flash lamp 3, only stimulating light having a wavelength in the vicinity of 365 nm which can efficiently stimulate phosphor material contained in an ink on the surface of the bill 2 transmits through the filter 4 attached on the front face of the xenon flash lamp 3 and the entire surface of the bill 2 is irradiated therewith.

The surface of the bill 2 is formed with a stamp portion formed by stamping with an ink containing phosphor material and the phosphor material emits luminescence in response to the irradiation with the stimulating light.

Figure 4:
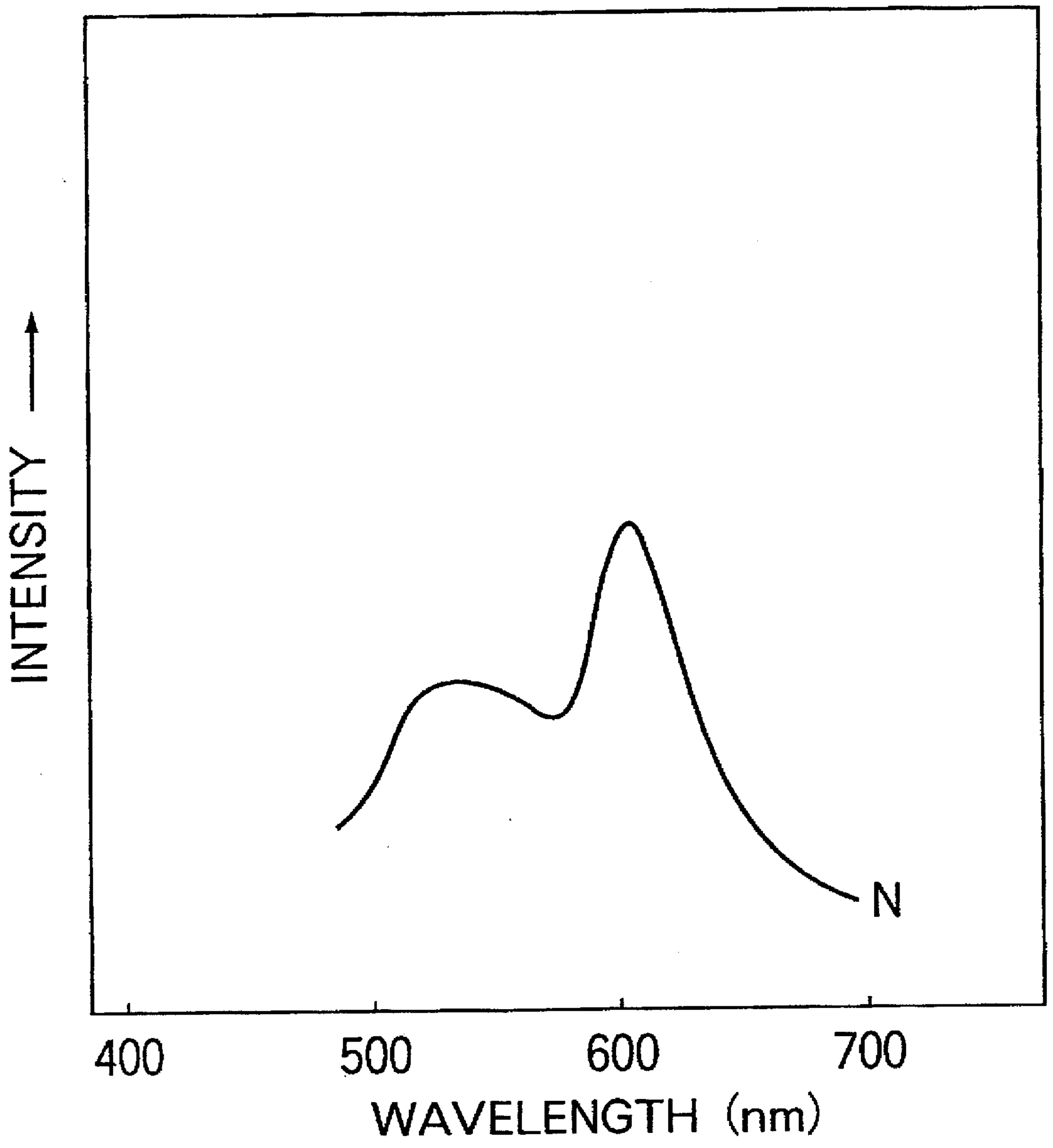
FIG. 4 is a graph showing the relationship between the wavelength and intensity of light entering a filter attached on the front face of a photomultiplier when the surface of a bill is irradiated with a stimulating light from a xenon flash lamp.

The luminescence emitted from the surface of bill 2 is photoelectrically detected through the filter 5 by the photomultiplier 6. FIG. 4 is a graph showing the relationship between the wavelength and intensity of the light entering the filter 5 attached on the front face of the photomultiplier 6 when the surface of a bill 2 is irradiated with the stimulating light from the xenon flash lamp 3. As shown in FIG. 4, light incident on the filter 5 has peaks in the vicinity of 530 nm and 600 nm. However, the light having a wavelength in the vicinity of 530 nm is light reflected from the surface of bill 2 itself and is not luminescence emitted from the phosphor material. Therefore, the filter 5 is constituted so as to transmit only light of wavelengths equal to and greater than about 580 nm, thereby lowering noise.

Therefore, of the light emitted from the surface of the bill 2, the photomultiplier 6 receives only light having wavelengths equal to and greater than about 580 nm, namely, the luminescence emitted from the phosphor material contained in an ink on the surface of the bill 2 and produces voltage signals in accordance with the amount of the luminescence. The voltage signals produced by the photomultiplier 6 are input to the A/D converter 8 and digitized therein. The digitized voltage signals are input to the RAM 12 at predetermined times in accordance with timing signals output from the CPU 10 and are stored therein as detected data.

The energy E of light is a function of its wavelength $\lambda$ and can be expressed as $E=hc/\lambda$ wherein h is Planck's constant. Therefore, it is possible to know the wavelength of the detected light based on the values of the voltage signals produced by the photomultiplier 6 of known composition and the kind of the phosphor material emitting the light can be judged by determining the wavelength of the detected light.

As reference data, the ROM 11 stores the relationship between the voltage signal values produced by the photomultiplier 6 when receiving luminescence emitted from phosphor material contained in an ink of the stamped portion formed on the surface of the bill 2 in response to the irradiation with the stimulating light and digitized by the A/D converter 8 and times elapsed after the completion of irradiation with the stimulating light, the relationship between the voltage signal values produced by the photomultiplier 6 when receiving light emitted from the surface of a copy of the bill 2 in response to the irradiation with the stimulating light and digitized by the A/D converter 8 and the time elapsed after the completion of irradiation with the stimulating light, and the relationship between the voltage signal values produced by the photomultiplier 6 when receiving light emitted from the surface of a copy of the bill 2 on which phosphor material has been coated with a fluorescent ink pen in response to the irradiation with the stimulating light and digitized by the A/D converter 8 and the time elapsed after the completion of irradiation with the stimulating light.

When a predetermined time has passed after the completion of irradiation with the stimulating light, the CPU 10 reads the data detected at elapse of time t1 from the completion of irradiation with the stimulating light and stored in the RAM 12 and also reads the reference data for elapse of time t1 from the completion of irradiation with the stimulating light.

Figure 5:
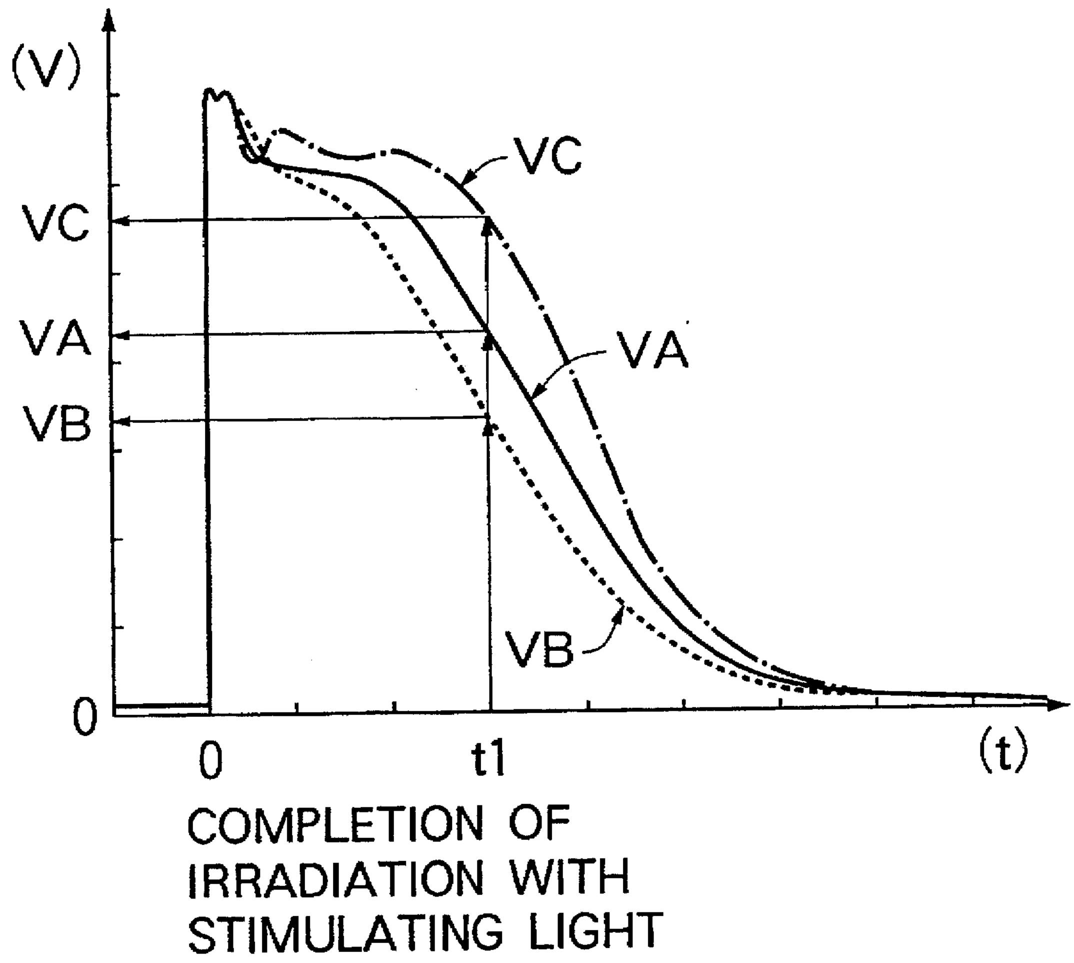
FIG. 5 is a graph showing reference data.

FIG. 5 is a graph showing a reference data curve VA indicating the relationship between the voltage signal values produced by the photomultiplier 6 when receiving luminescence emitted from phosphor material contained in an ink of the stamped portion formed on the surface of the bill 2 in response to the irradiation with the stimulating light and digitized by the A/D converter 8 and the time elapsed after the completion of irradiation with the stimulating light, a reference data curve VB indicating the relationship between the voltage signal values produced by the photomultiplier 6 when receiving light emitted from the surface of a copy of the bill 2 in response to the irradiation with the stimulating light and digitized by the A/D converter 8 and the time elapsed after the completion of irradiation with the stimulating light, and a reference data curve VC indicating the relationship between the voltage signal values produced by the photomultiplier 6 when receiving light emitted from the surface of a copy of the bill 2 on which phosphor material is coated with a fluorescent ink pen in response to the irradiation with the stimulating light and digitized by the A/D converter 8 and the time elapsed after the completion of irradiation with the stimulating light. As shown in FIG. 5, the energy of luminescence emitted from phosphor material contained in an ink from a fluorescent ink pen is generally higher than that of luminescence emitted from phosphor material contained in an ink of the stamped portion formed on the surface of a bill 2 and the energy of light reflected from the surface of a copy of a bill 2 which does not contain any phosphor material is generally lower than that of luminescence emitted from phosphor material contained in an ink of the stamped portion formed on the surface of a bill 2.

The intensity of luminescence emitted from the phosphor material in response to irradiation with the stimulating light attenuates with the elapse of time and the amount of light reflected from the surface of the copy of a bill decreases with the elapse of time. Therefore, as shown in FIG. 5, the voltage signal values of the respective reference data become lower with the elapse of time.

The CPU 10 compares the data Vt1 detected at elapse of time t1 from the completion of irradiation with the stimulating light and the reference data VAt1, VBt1 and VCt1 for elapse of time t1 from the completion of irradiation with the stimulating light read from the reference data VA, VB and VC stored in the ROM 11, and discriminates the bill 2 as a current bill if the following formula is satisfied.

$$VAt1-(VAt1-VBt1)\times\alpha \leq Vt1 \leq VAt1+(VCt1-VAt1)\times\alpha$$

where $\alpha$ is a coefficient for determining a threshold value so that the bill 2 can be accurately discriminated even if a measurement error occurs, and $\alpha<1$ As shown in FIG. 5, since the reference data VAt1, VBt1 and VCt1 for elapse of time t1 from the completion of irradiation with the stimulating light are different from each other and VBt1<VAt1<VCt1, whether or not the bill 2 is current can be discriminated by judging whether or not the voltage signal value Vt1 detected at elapse of time t1 from the completion of irradiation with the stimulating light substantially coincides with VAt1.

On the contrary, if the above formula is not satisfied, the CPU 10 discriminates that the bill 2 is not a current bill but a foreign bill or a counterfeit bill and causes a display means (not shown) to display information to this effect and the RAM 12 to store the same information.

According to the above described embodiment, since whether or not the bill 2 is a current bill is discriminated by comparing the voltage signal value indicating the energy of luminescence corresponding to the wavelength $\lambda$ of luminescence emitted from phosphor material with the voltage signal values of the reference data indicating the energy, even if phosphor material is coated on the surface of a copy of a bill 2 in the same pattern as that of the stamped portion of a current bill, it is possible to reliably discriminate the thus counterfeited bill with high discrimination accuracy.

Figure 6:
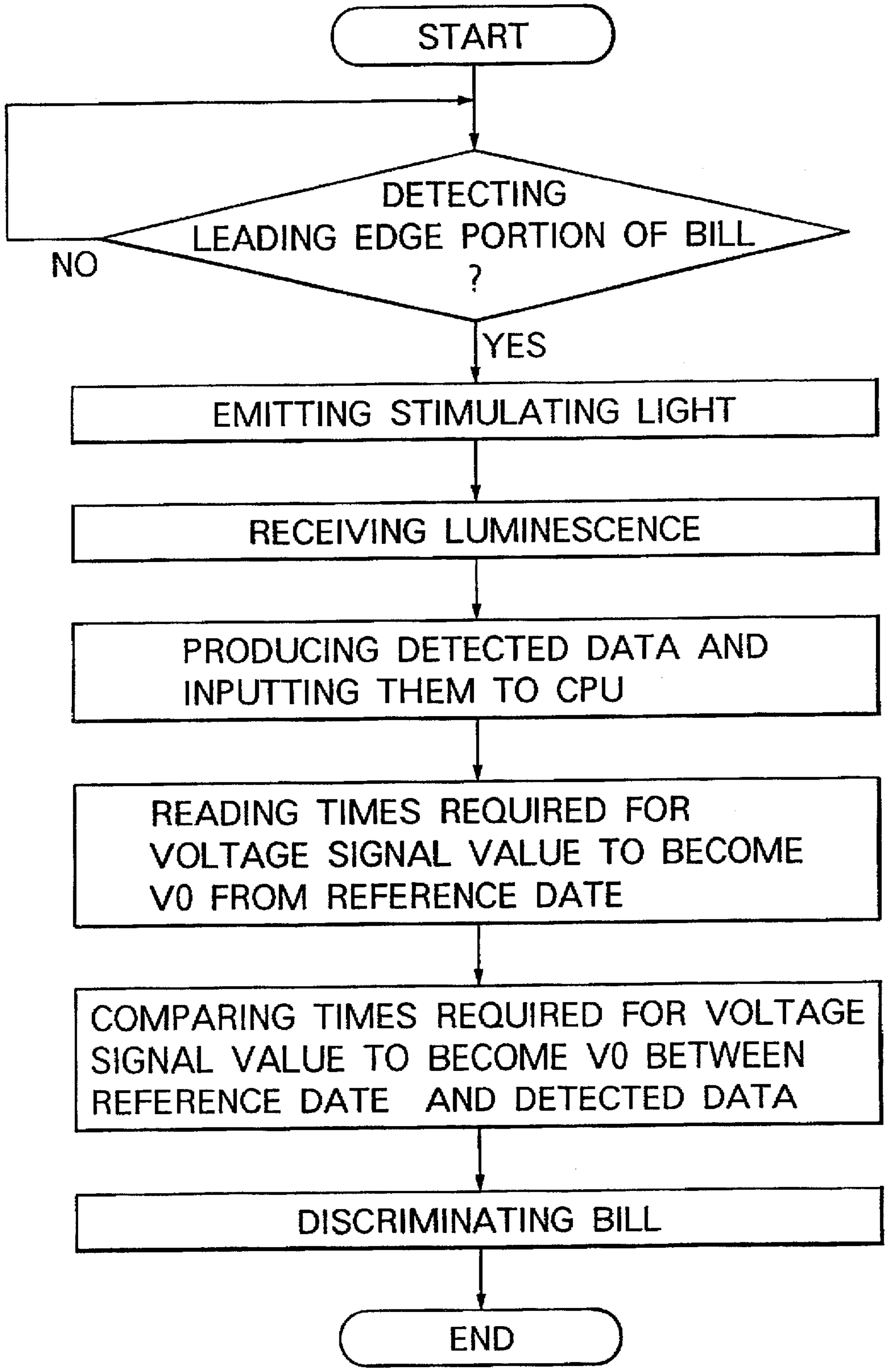
FIG. 6 is a flow chart showing another example of a bill discriminating procedure effected by a bill discriminating apparatus which is an embodiment of the present invention.

FIG. 6 is a flow chart showing another example of a bill discriminating procedure effected by a bill discriminating apparatus which is an embodiment of the present invention.

As shown in FIG. 6, when the sensor 7 detects the leading end portion of the bill 2 being transported in the bill transporting passage 1, a bill detection signal is output from the sensor 7 to the CPU 10. When the CPU 10 receives the bill detection signal from the sensor 7, it outputs a light emitting signal to the xenon flash lamp 3. When the xenon flash lamp 3 receives the light emitting signal from the CPU 10, it emits a stimulating light toward the entire surface of the bill 2. Of the light emitted from the xenon flash lamp 3, only stimulating light having a wavelength in the vicinity of 365 nm which can efficiently stimulate phosphor material contained in an ink on the surface of the bill 2 transmits through the filter 4 attached on the front face of the xenon flash lamp 3 and the entire surface of the bill 2 is irradiated therewith.

The surface of the bill 2 is formed with a stamp portion formed by stamping with an ink containing phosphor material and the phosphor material emits luminescence in response to the irradiation with the stimulating light.

The luminescence emitted from the surface of bill 2 is photoelectrically detected through the filter 5 by the photomultiplier 6. At this time, light of a wavelength lower than about 580 nm is cut by the filter 5 and the photomultiplier 6 receives only light having wavelengths equal to and greater than about 580 nm, namely, only the component of the light emitted from the surface of the bill 2 corresponding to the luminescence emitted from the phosphor material contained in an ink on the surface of the bill 2, and produces voltage signals in accordance with the amount of the luminescence. The voltage signals produced by the photomultiplier 6 are input to the A/D converter 8 and digitized therein. The digitized voltage signals are input to the CPU 10.

The CPU 10 reads the times ta, tb and tc required for the voltage signal value to become V0 after the completion of irradiation with the stimulating light from the reference data stored in the ROM 11 and compares the time t required for the voltage signal value of the detected data input from the A/D converter 8 to become V0 after the completion of irradiation with the stimulating light. As a result, when the following formula is satisfied, the CPU 10 discriminates that the bill 2 is a current bill.

$$ta-(ta-tb)\times\beta\leqq t\leqq ta+(tc-ta)\times\beta$$

where β is a coefficient for determining a threshold value.

Figure 7:
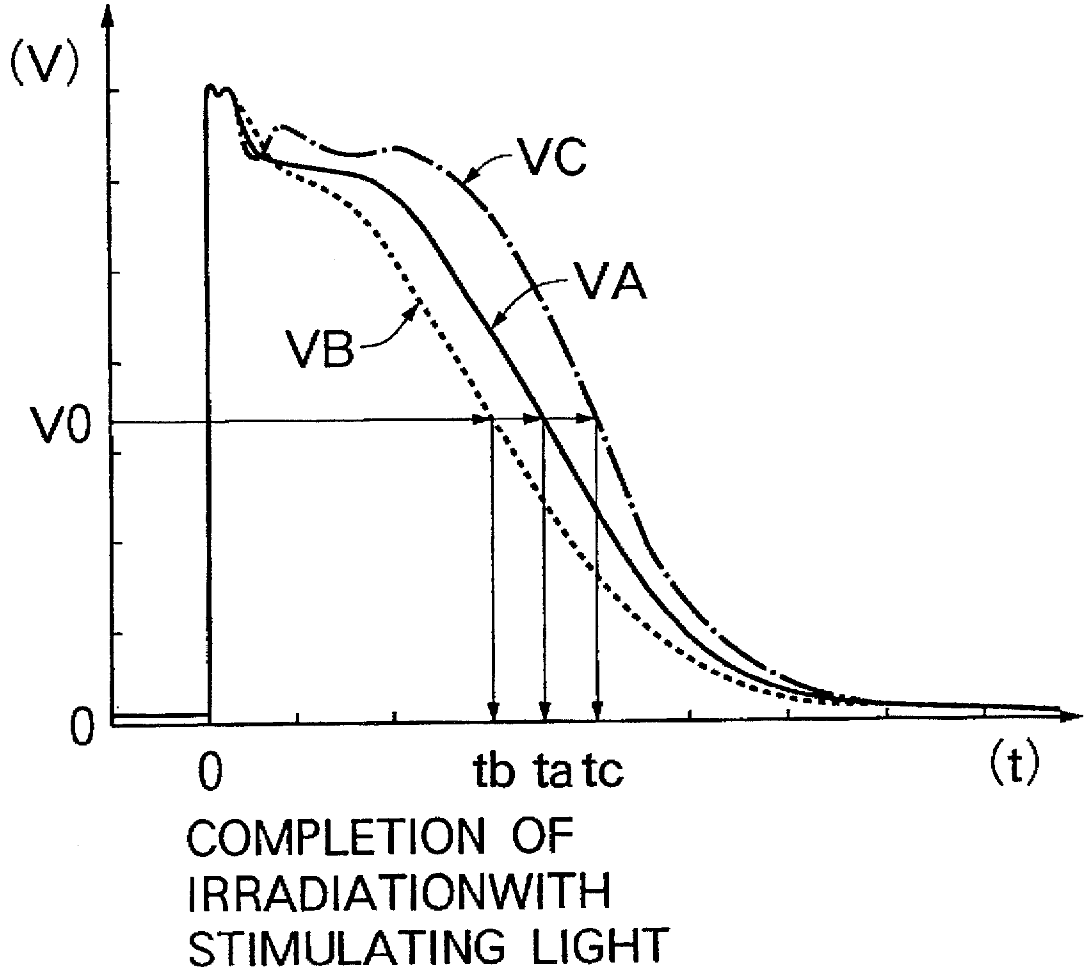
FIG. 7 is a graph showing reference data.

As shown in FIG. 7, the time ta required for the voltage signal value produced by the photomultiplier 6 when it receives luminescence emitted from phosphor material contained in an ink of the stamped portion formed on the surface of a bill 2 in response to the irradiation with the stimulating light and digitized by the A/D converter 8 to become V0, the time tb required for the voltage signal value produced by the photomultiplier 6 when it receives light emitted from the surface of a copy of a bill 2 in response to the irradiation with the stimulating light and digitized by the A/D converter 8 to become V0 and the time tc required for the voltage signal value produced by the photomultiplier 6 when it receives light emitted from the surface of a copy of a bill 2 on which phosphor material is coated with a fluorescent ink pen in response to the irradiation with the stimulating light and digitized by the A/D converter 8 to become V0 are different from each other and tb<ta<tc. Therefore, it is possible to discriminate whether or not the bill is a current bill by judging whether or not the time t required for the detected voltage signal value V becoming V0 substantially coincides ta.

On the contrary, if the above formula is not satisfied, the CPU 10 discriminates that the bill 2 is not a current bill but a foreign bill or a counterfeit bill and causes a display means (not shown) to display information to this effect and the RAM 12 to store the same information.

According to the above described embodiment, since whether or not a bill 2 is a current bill is discriminated by comparing the time required for the voltage signal value indicating the energy of luminescence corresponding to the wavelength λ of luminescence emitted from phosphor material to become a predetermined value with the time required for the voltage signal value of the reference data indicating the energy to become the same value, even if phosphor material is coated on the surface of a copy of a bill 2 in the same pattern as that of the stamped portion of a current bill, it is possible to reliably discriminate the thus counterfeited bill with high discrimination accuracy.

The present invention has thus been shown and described with reference to specific embodiments. However, it should be noted that the present invention is in no way limited to the details of the described arrangements but changes and modifications may be made without departing from the scope of the appended claims.

For example, in the above described embodiment, although the explanation is made with respect to the discrimination of a bill in the case where phosphor material is contained in the stamped portion stamped on the surface of a bill 2, the present invention can be applied to the discrimination of a bill in the case where no stamped portion is formed on the surface of the bill 2 but an ink containing phosphor material is used for printing the bill 2.

Further, whether or not a bill 2 is a current bill is discriminated in the embodiment in the flow chart of FIG. 3 by comparing the voltage signal value detected at elapse of time t1 from the completion of irradiation with the stimulating light with the corresponding reference data and in the embodiment shown in the flow chart of FIG. 6 by comparing the time t required for the voltage signal value V to become V0 after the completion of irradiation with the stimulating light with the times ta, tb and tc required for the voltage signal values of the reference data to become V0. However, it is possible to discriminate whether or not a bill 2 is a current bill by comparing the voltage signal values detected at a plurality of points of time after the completion of irradiation with the stimulating light with the corresponding voltage signal values of the reference data or by comparing the times required for the detected voltage signal value V to become a plurality of different voltage signal values with the times required for the voltage signal values of the reference data to become the respective values.

Furthermore, although the discrimination of a bill is effected by the CPU 10 after the detected data has been stored in the RAM 12 in the embodiment shown in the flow chart of FIG. 3, it is possible to discriminate whether or not a bill 2 is a current bill without a RAM 12 by sequentially fetching the detected data into the CPU 10 and causing the CPU 10 to compare the voltage signal value detected at elapse of a predetermined time from the completion of irradiation with the stimulating light with the corresponding voltage signal value of the reference data.

Moreover, although the entire surface of a bill is irradiated with the stimulating light in the above described embodiments, when phosphor material is contained in only a specific portion of the surface of a bill 2 such as a stamped portion, it suffices to irradiate only the portion containing phosphor material with the stimulating light.

Further, although a xenon flash lamp is used in the above described embodiments, any of various kinds of light sources, such as a laser beam source, can be used insofar as it emits light which can stimulate phosphor material.

Furthermore, in the above described embodiments, the ROM 11 stores the reference data obtained by irradiating a copy of a bill 2 with the stimulating light and the reference data obtained by irradiating a copy of a bill on which phosphor material is coated with a fluorescent ink pen in addition to the reference data of a bill 2 and determines a threshold value for discriminating a bill 2 with high accuracy even if measurement error occurs. However, it is possible to store other kinds of reference data in the ROM 11 and determine a threshold value. Further, it is possible to discriminate a bill 2 to be a current bill when the detected data coincides with the reference data of a bill 2 within a predetermined error range without storing reference data other than the reference data of a bill 2.

Further, in this specification and the appended claims, the respective means need not necessarily be physical means and arrangements whereby the functions of the respective means are accomplished by software fall within the scope of the present invention. In addition, the function of a single means may be accomplished by two or more physical means and the functions of two or more means may be accomplished by a single physical means.

I claim:

1. A bill discriminating apparatus comprising:

stimulating light irradiating means for projecting a stimulating light onto a surface of a bill;

photoelectrical converting means for photoelectrically detecting light emitted from a surface of the bill in response to the stimulating light and producing detected data corresponding to an amount of the light detected;

reference data storing means for storing reference data, the reference data storing means storing, as the reference data:

first reference data obtained by irradiating a genuine bill with a stimulating light and photoelectrically detecting light emitted from phosphor material on a surface of the genuine bill, second reference data obtained by irradiating a copy of a bill and photoelectrically detecting light emitted from a surface of the copy, and third reference data obtained by irradiating a copy of a bill on which phosphor material has been coated and photoelectrically detecting light emitted from phosphor material on a surface of the copy; and discriminating means for comparing the detected data produced by the photoelectrical converting means and the reference data stored in the reference data storing means, and discriminating the bill, the discriminating means discriminating the bill by comparing the detected data produced by the photoelectrical detecting means with the first reference data, the second reference data and the third reference data.

2. A bill discriminating apparatus comprising:

stimulating light irradiating means for projecting a stimulating light onto a surface of a bill;

photoelectrical converting means for photoelectrically detecting light emitted from a surface of the bill in response to the stimulating light and producing detected data corresponding to an amount of the light detected;

reference data storing means for storing reference data, the reference data storing means storing, as the reference data:

first reference data obtained by irradiating a genuine bill with a stimulating light and photoelectrically detecting light emitted from phosphor material on a surface of the genuine bill, second reference data obtained by irradiating a copy of a bill and photoelectrically detecting light emitted from a surface of the copy, and a third reference data obtained by irradiating a copy of a bill on which phosphor material has been coated and photoelectrically detecting light emitted from phosphor material on a surface of the copy; and discriminating means for comparing the detected data produced by the photoelectrical converting means and the reference data stored in the reference data storing means, and discriminating the bill, the discriminating means discriminating the bill by comparing a value of data detected when a predetermined time period has passed after completion of irradiation with the stimulating light by the stimulating light irradiating means with the first reference data, the second reference data and the third reference data.

3. A bill discriminating apparatus comprising:

stimulating light irradiating means for projecting a stimulating light onto a surface of a bill;

photoelectrical converting means for photoelectrically detecting light emitted from a surface of the bill in response to the stimulating light and producing detected data corresponding to an amount of the light detected;

reference data storing means for storing reference data, the reference data storing means storing, as the reference data:

first reference data obtained by irradiating a genuine bill with a stimulating light and photoelectrically detecting light emitted from phosphor material on a surface of the genuine bill, second reference data obtained by irradiating a copy of a bill and photoelectrically detecting light emitted from a surface of the copy, and third reference data obtained by irradiating a copy of a bill on which phosphor material has been coated and photoelectrically detecting light emitted from phosphor material on a surface of the copy; and discriminating means for comparing the detected data produced by the photoelectrical converting means and the reference data stored in the reference data storing means, and discriminating the bill, the discriminating means discriminating the bill by comparing data detected at a plurality of time points after completion of irradiation with the stimulating light by the stimulating light irradiating means with the first reference data, the second reference data and the third reference data.

4. A bill discriminating apparatus comprising:

stimulating light irradiating means for projecting a stimulating light onto a surface of a bill;

photoelectrical converting means for photoelectrically detecting light emitted from a surface of the bill in response to the stimulating light and producing detected data corresponding to an amount of the light detected;

reference data storing means for storing reference data, the reference data storing means storing, as the reference data:

first reference data obtained by irradiating a genuine bill with a stimulating light and photoelectrically detecting light emitted from phosphor material on a surface of the genuine bill, second reference data obtained by irradiating a copy of a bill and photoelectrically detecting light emitted from a surface of the copy, and third reference data obtained by irradiating a copy of a bill on which phosphor material has been coated and photoelectrically detecting light emitted from phosphor material on a surface of the copy; and discriminating means for comparing the detected data produced by the photoelectrical converting means and the reference data stored in the reference data storing means, and discriminating the bill, the discriminating means discriminating the bill by comparing time required for the detected data to become a predetermined value after completion of irradiation with the stimulating light by the stimulating light irradiating means with time required for the first reference data, the second reference data and the third reference data to become the predetermined value after completion of irradiation with the stimulating light.

5. A bill discriminating apparatus comprising:

stimulating light irradiating means for projecting a stimulating light onto a surface of a bill;

photoelectrical converting means for photoelectrically detecting light emitted from a surface of the bill in response to the stimulating light and producing detected data corresponding to an amount of the light detected;

reference data storing means for storing reference data, the reference data storing means storing, as the reference data:

first reference data obtained by irradiating a genuine bill with a stimulating light and photoelectrically detecting light emitted from phosphor material on a surface of the genuine bill, second reference data obtained by irradiating a copy of a bill and photoelectrically detecting light emitted from a surface of the copy, and third reference data obtained by irradiating a copy of a bill on which phosphor material has been coated and photoelectrically detecting light emitted from phosphor material on a surface of the copy; and discriminating means for comparing the detected data produced by the photoelectrical converting means and the reference data stored in the reference data storing means, and discriminating the bill, the discriminating means discriminating the bill by comparing a plurality of times required for the detected data to become a plurality of different predetermined values after completion of irradiation with the stimulating light by the stimulating light irradiating means with a plurality of times required for the first reference data, the second reference data and the third reference data to become the corresponding values after completion of irradiation with the stimulating light.

6. A bill discriminating apparatus comprising:

a light source to stimulate a surface of a bill;

a photodetector to detect light emitted from a surface of the bill in response to stimulation from the light source, the photodetector producing detected data corresponding to an amount of light detected from the bill;

memory to store reference data, the reference data comprising:

first reference data obtained by irradiating a genuine bill with a stimulating light and photoelectrically detecting light emitted from phosphor material on a surface of the genuine bill, second reference data obtained by irradiating a copy of a bill and photoelectrically detecting light emitted from a surface of the copy, and third reference data obtained by irradiating a copy of a bill on which phosphor material has been coated and photoelectrically detecting light emitted from phosphor material on a surface of the copy; and a discriminator to compare the detected data produced by the photodetector and the first reference data, the second reference data, and the third reference data, and to discriminate the bill by the comparison.

* * * * *